UNITED STATES PATENT OFFICE 2,493,780

3,11-DIKETO-17,20-DIHYDROXY-PREGNANES AND PROCESS

Lewis Hastings Sarett, Princeton, N. J., assignor to Merck & Co., Inc., Rahway, N. J., a corporation of New Jersey No Drawing. Application July 13, 1946, Serial No. 683,427

7 Claims. (Cl. 260—397.4)

This invention is concerned generally with novel chemical compounds of the cyclopentanodimethylpolyhydrophenanthrene series and to processes for preparing the same; more particularly it relates to 3,11-diketo-17,20-dihydroxy-pregnane and acylated derivatives thereof, intermediates useful in the production of compounds having the physiological activity of adrenal cortex hormones, and to processes for synthesizing said intermediates in substantially pure form from readily available starting materials.

The compounds 3,11-diketo-17,20-dihydroxy-pregnane and 3,11-diketo-17-hydroxy-20-acyloxy-pregnane, subject of this application, can be represented by the following structural formula:

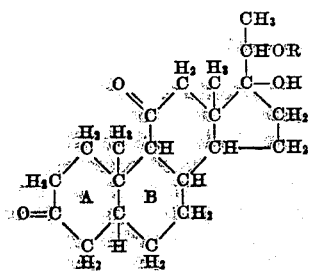

wherein R can be hydrogen or acyl.

The above formula, for purposes of convenience, is hereinafter reproduced below in the abbreviated form:

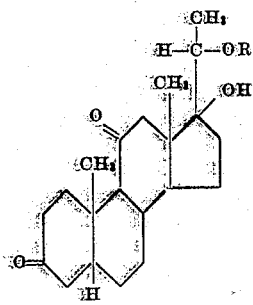

wherein R has the significance above defined. In the following description of the invention, the stereochemical relationship of rings A and B is indicated in the formulae by a solid line representing the valence bond in the cis configuration.

It is now found that 3,11-diketo-17,20-dihydroxy-pregnane can be prepared by reactions represented generically as follows:

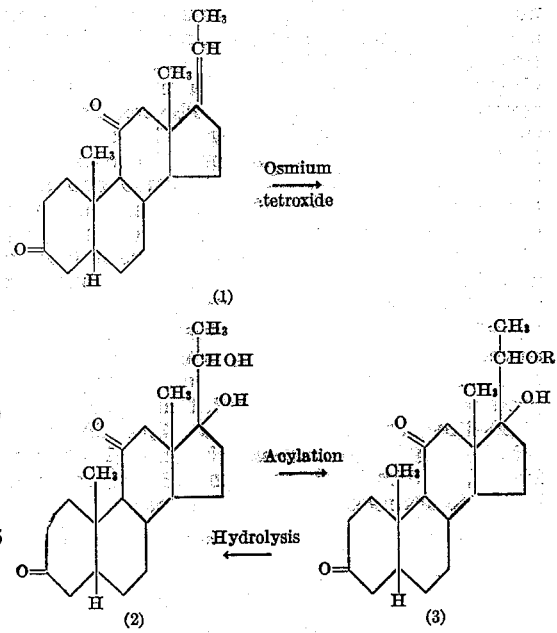

wherein R is acyl.

The reactions indicated above are conducted as follows: The starting material, $\Delta^{17,20}$-3,11-diketopregnene (1), which can be prepared as disclosed in my co-pending applications, Serial No. 605,194, filed, July 14, 1945, now abandoned; and Serial No. 687,982 filed August 2, 1946, is reacted with an agent capable of converting an olefinic bond to the corresponding glycol, such as osmium tetroxide, or hydrogen peroxide in contact with a catalytic amount of osmium tetroxide, whereby the ethylenic linkage is converted to the corresponding glycol to produce 3,11-diketo-17,20-dihydroxy-pregnane (2); this compound is reacted with an acylating agent to produce 3,11-diketo-17-hydroxy-20-acyloxy-pregnane (3) which can be readily purified, as for example by recrystallization from a solvent. The pure 20-acyloxy pregnane can then be hydrolyzed to produce substantially pure 3,11-diketo-17,20-dihydroxy-pregnane.

When the starting material, said $\Delta^{17,20}$-3,11-diketo-pregnane (1), is prepared according to the preferred processes described in my copending applications hereinabove referred to, it is obtained admixed with the corresponding $\Delta^{20,21}$-isomer, compound (4) below, from which it is not readily separated. Accordingly, I prefer to react said mixture of $\Delta^{17,20}$-3,11-diketo-pregnene (1) and $\Delta^{20,21}$-3,11-diketo-pregnene (4), which can be represented by the following structural formulae:

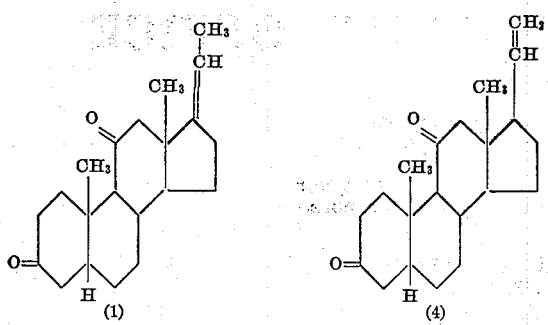

directly with osmium tetroxide; this is accomplished by dissolving said mixture in a substantially inert solvent, as for example, a dialkyl ether such as ethyl ether, and adding a solution of osmium tetroxide thereto. A tertiary amine, such as pyridine, quinoline, picoline, and the like, may then be added to this solution and the mixture allowed to react, preferably at a temperature between about 0.° C. and 20° C. The reaction mixture is allowed to stand for several hours at about 0° C. to complete crystallization of the osmate esters which are removed by filtration and then hydrolyzed by treating with an aqueous solution of an alkaline reducing agent, as for example, sodium sulfite. The hydrolysis mixture is filtered and the filtrate evaporated to small volume and the mixture of stereoisomeric glycols extracted therefrom by means of a chlorinated hydrocarbon solvent, such as chloroform, ethylene dichloride, and the like; the solvent is then evaporated to produce a crude mixture containing 3,11-diketo-17,20-dihydroxy-pregnane (2), 3,11-diketo-20-($\alpha$), 21-dihydroxy-pregnane (5) and 3,11-diketo-20 ($\beta$), 21-dihydroxy-pregnane (6), represented by the following structural formulae:

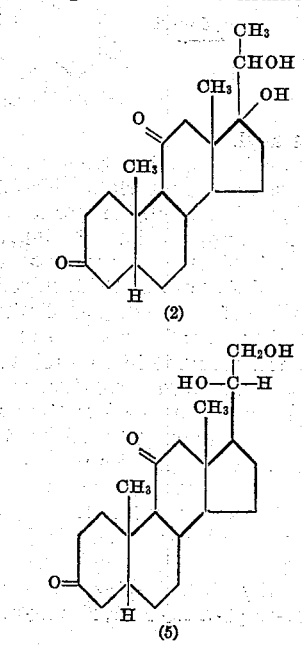

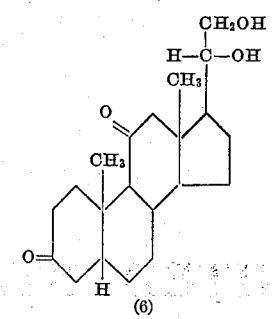

The mixture of diketo-dihydroxy-pregnanes is then reacted with a cyclic anhydride of a dicarboxylic acid, as for example, succinic anhydride, adipic anhydride, phthalic anhydride, and the like. The reaction can be conducted at room temperature, but is best carried out by heating the reactants at about 90–100° C. in the presence of an anhydrous alkaline medium, preferably a tertiary amine such as pyridine, quinoline, picoline and the like, whereby the primary hydroxyl groups present in the stereoisomers of 3,11-diketo-20,21-dihydroxy-pregnane are preferentially esterified to produce the corresponding stereoisomers of 3,11-diketo-20-hydroxy-21-(omega-carboxy-acyloxy)-pregnane (7), which can be represented by the following structural formula:

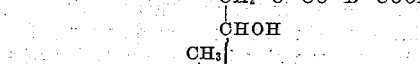

wherein B is an alkylene, arylene or aralkylene radical.

The reaction mixture is mixed with water to destroy unreacted anhydride and the resulting mixture is evaporated substantially to dryness, preferably under reduced pressure. The residual material, which consists of the isomeric 3,11-diketo-20-hydroxy-20-(omega-carboxy-acyloxy)-pregnane (7) admixed with unesterified 3,11-diketo-17,20-dihydroxy-pregnane (2), is treated with an aqueous alkaline solution, such as aqueous sodium carbonate solution, and a water-immiscible solvent. Although it is preferred to employ chlorinated hydrocarbon solvent, as for example, chloroform, ethylene dichloride, and the like, it is to be understood that the invention is not confined thereto, since most other organic water-immiscible solvents are operable, as for example dialkyl ethers, esters, hydrocarbon solvents, and the like. The non-aqueous layer, which contains the desired 3,11-diketo-17,20-dihydroxy-pregnane (2) is separated from the aqueous solution which contains the salts of the half esters (7) of the stereoisomeric 3,11-diketo-20,21-dihydroxy-pregnanes. Evaporation of this non-aqueous layer yields crude 3,11-diketo-17,20-dihydroxy-pregnane (2), substantially uncontaminated by 20,21-dihydroxy-pregnane derivative.

The crude 3,11-diketo-17,20-dihydroxy-pregnane is then reacted with an acylating agent such as acetic anhydride, acetyl chloride, benzoyl chloride, propionic anhydride, butyric anhydride, and the like, preferably in the presence of a tertiary nitrogen base to produce the corresponding 3,11-diketo-17-hydroxy-20-acyloxy-pregnane. The reaction can be carried out at room temperature, but the reaction mixture can be heated, if desired, to about 100° C. or higher. When the acylating agent employed comprises acetic anhydride and pyridine, and these are reacted with 3,11-diketo-17,20-dihydroxy-pregnane at approximately 100° C., the reaction is substantially complete in about one half hour. The acylated derivative is conveniently isolated from the reaction mixture by diluting with water, whereupon the acyl derivative crystallizes and is recovered by filtration. It is purified by recrystallization from a mixed solvent comprising an aromatic hydrocarbon solvent such as benzene, toluene, and/or an aliphatic alcohol such as ethanol, methanol, and the like.

The substantially pure acylated pregnane derivative is reacted with a hydrolyzing agent under saponifying conditions to produce substantially pure 3,11-diketo-17,20-dihydroxy-pregnane. Hydrolyzing agents operable for this purpose include alkali hydroxides, carbonates and bicarbonates, alkaline earth hydroxides, mineral acids and the like which can be used in water or aqueous-organic solvent solution. It is presently preferred to use an aqueous alcoholic solution containing a mixture of alkali carbonate and alkali bicarbonate, as, for example, an aqueous methanol solution, containing both potassium carbonate and potassium bicarbonate. The reaction is best carried out at about 25° C., but higher temperatures can be employed, if desired. The pure 3,11-diketo-17,20-dihydroxy-pregnane can be isolated from the hydrolyzed solution by any convenient method, as for example, by evaporating to dryness; it can then be separated from inorganic solvents by extracting the residue with a halogenated hydrocarbon solvent, such as chloroform, ethylene dichloride, and the like, from which the product is obtained in crystalline form upon evaporation of the solvent. Further purification can be effected, if desired, by recrystallizing this product from an ester of an aliphatic acid such as ethyl acetate.

The following examples illustrate methods of carrying out the present invention, but it is to be understood that these examples are given by way of illustration and not of limitation.

*Example 1*

About 9.65 g. of a mixture containing $\Delta^{17,20}$- and $\Delta^{20,21}$-3,11-diketo-pregnene is dissolved in about 50 cc. of absolute ether, and a solution containing about 8.0 g. of osmium tetroxide in about 50 cc. of absolute ether is added thereto. About 2.4 cc. of pyridine is then added and the mixture is allowed to stand at about 20° C. for approximately 1 hour and then at about 0° C. for approximately 36 hours. The precipitated osmate esters are removed by filtration, suspended in about 350 cc. of alcohol and a solution of about 55 g. of sodium sulfite in about 240 cc. of hot water is added thereto and the mixture refluxed for approximately 3½ hrs. The mixture is then filtered and the insoluble material extracted twice with approximately 200 cc. portions of hot alcohol and the alcohol extracts combined with the initial filtrate. This filtrate is then evaporated under reduced pressure to a small volume, diluted with water and extracted with chloroform. The chloroform layer is washed with water and evaporated to dryness under reduced pressure to produce a crude mixture which contains 3,11-diketo-17,20-dihydroxy-pregnane, 3,11-diketo-20(α),21-dihydroxy-pregnane and 3,11-diketo-20(β), 21-dihydroxy-pregnane.

*Example 2*

The separation of 3,11-diketo-17,20-dihydroxy-pregnane from the stereoisomeric 3,11-diketo-20,21-dihydroxy-pregnanes is achieved by dissolving in about 9.05 g. of the mixture in about 25 cc. of pyridine, heating the solution to about 95° C. and adding thereto about 5.0 g. of succinic anhydride. The mixture is heated at about 95° C. for approximately 15 minutes additional time, about 5 cc. of water is added to the hot solution to decompose excess succinic anhydride and the pyridine is then evaporated therefrom under reduced pressure. The residual material is dissolved in chloroform, the chloroform solution is washed with dilute hydrochloric acid to remove traces of pyridine, then with water, and the hemi-succinates of the stereoisomeric 3,11-diketo-20,21-dihydroxy-pregnanes are finally extracted therefrom as their potassium salts, by means of a 10% aqueous potassium carbonate solution.

The chloroform extract which contains the non-acidic 3,11-diketo-17,20-dihydroxy-pregnane is evaporated to dryness to produce about 3.6 g. of crude material. This impure product is dissolved in a solution containing about 5 cc. of pyridine and about 5 cc. of acetic anhydride and the resulting solution heated on a steam bath for approximately ½ hour. The solution is cooled, water is added and the crystalline product recovered by filtration and purified by crystallization from benzene alcohol and finally from benzene to produce substantially pure 3,11-diketo-17-hydroxy-20-acetoxy-pregnane; M. P. 227–229° C. (corr.); $(\alpha)_D = +75°$ (acetone).

About 1.80 g. of 3,11-diketo-17-hydroxy-20-acetoxy-pregnane is added to a mixture containing about 180 cc. of methanol, about 30 cc. water, about 1.8 g. of potassium bicarbonate and about 0.9 g. of potassium carbonate. The mixture is heated under reflux until the crystals have dissolved and the mixture is then allowed to stand at about 25° C. for approximately 40 hours. The methanol is then evaporated under reduced pressure, the residue extracted with chloroform and the chloroform solution washed with water. The chloroform solution is then evaporated to dryness and the residue recrystallized repeatedly from ethyl acetate to produce pure 3,11-diketo-17,20-dihydroxy-pregnane; M. P. 186–187° C. (corr.); $(\alpha)_D = +47°$ (acetone).

Various changes and modifications may be made in my process as described without departing from the scope of my invention. To the extent that these changes and modifications are within the purview of the annexed claims, they are to be considered as part of my invention.

I claim:

1. The process of preparing 3,11-diketo-17,20-dihydroxy pregnane in substantially pure form, which comprises reacting a mixture containing $\Delta^{17,20}$-3,11-diketo-pregnane and $\Delta^{20,21}$-3,11-diketo-pregnane with a compound selected from the class which consists of osmium tetroxide and hydrogen peroxide to produce a mixture containing 3,11-diketo-17,20-dihydroxy pregnane, 3,11-diketo-20-alpha-21-dihydroxy pregnane, and 3,11-diketo-20-beta-21-hydroxy-pregnane; reacting this mixture with a cyclic anhydride of a dicarboxylic acid to convert the 20,21-dihydroxy stereoisomers to the corresponding stereoisomers of 3,11-diketo-20-hydroxy-21-(carboxy-acyloxy) pregnane admixed with unchanged 3,11-diketo-17,20-dihydroxy-pregnane; separating the non-acidic 3,11-diketo-17,20-dihydroxy pregnane from this mixture; reacting this compound with an acylating agent to produce 3,11-diketo-17-hydroxy-20-acyloxy-pregnane; purifying this acyloxy derivative by fractional crystallization; and hydrolyzing to produce the desired 3,11-diketo-17,20-dihydroxy pregnane in substantially pure form.

2. The process of preparing a stereoisomer of 3,11-diketo-17,20-dihydroxy pregnane in substantially pure form, which comprises reacting a mixture containing $\Delta^{17,20}$-3,11-diketo-pregnane and $\Delta^{20,21}$-3,11-diketo-pregnane with osmium tetroxide to produce a mixture containing 3,11-diketo-17,20-dihydroxy-pregnane, 3,11-diketo-20-($\alpha$)-21-dihydroxy-pregnane, and 3,11-diketo-20-($\beta$)-21-dihydroxy-pregnane; reacting this mixture with succinic anhydride and pyridine to convert the stereoisomers of 3,11-diketo-20,21-dihydroxy-pregnane to the corresponding stereoisomers of 3,11-diketo-20-hydroxy-21 (-carboxy-propionoxy)-pregnane admixed with unchanged 3,11-diketo-17,20,dihydroxy-pregnane; separating the nonacidic 3,11-diketo-17,20-dihydroxy-pregnane from this mixture and reacting this compound with acetic anhydride and pyridine to produce 3,11-diketo-17-hydroxy-20-acetoxy pregnane; purifying this compound by fractional crystallization from ethyl acetate, and hydrolyzing to produce the desired 3,11-diketo-17,20-dihydroxypregnane in substantially pure form.

3. The process of separating 3,11-diketo-17,20-dihydroxy-pregnane from a mixture containing this isomer admixed with stereoisomers of 3,11-diketo-20,21-dihydroxy-pregnane which comprises reacting said mixture with a cyclic anhydride of a dicarboxylic acid to produce a mixture comprising unreacted 3,11-diketo-17,20-dihydroxy-pregnane admixed with the stereoisomeric 3,11-diketo-20-hydroxy-21 - (carboxy-acyloxy)-pregnane; and separating the non-acidic 3,11-diketo-17,20-dihydroxy-pregnane from this mixture.

4. The process of separating 3,11-diketo-17,20-dihydroxy-pregnane from a mixture containing this isomer admixed with stereoisomers of 3,11-diketo-20-21,-dihydroxy-pregnane, which comprises reacting said mixture with succinic anhydride and pyridine to produce a mixture comprising unreacted 3,11-diketo-17,20-dihydroxy-pregnane admixed with stereoisomeric 3,11-diketo-20-hydroxy-21 - ($\beta$-carboxy-propionoxy)-pregnane; and separating the non-acidic 3,11-diketo-17,20-dihydroxy-pregnane from this mixture by selective extraction from aqueous alkaline solution by means of a water-immiscible organic solvent.

5. 3,11-diketo-17,20-dihydroxy-pregnane, having a melting point of about 186–187° C. and an $(\alpha)_D$ approximately equal to $+47°$ in acetone.

6. 3,11-diketo-17-hydroxy-20-acetoxy - pregnane, having a melting point of about 227–229° C. and an $(\alpha)_D$ approximately equal to $+75°$ in acetone.

7. 20-substituted - 3,11 - diketo - 17 - hydroxy-pregnanes in which the substituent in the 20-position is a lower aliphatic carboxylic acyloxy radical.

LEWIS HASTINGS SARETT.

REFERENCES CITED

The following references are of record in the file of this patent:

UNITED STATES PATENTS

| Number | Name | Date |
|---|---|---|
| 2,183,589 | Reichstein | Dec. 19, 1939 |
| 2,254,562 | Bochmuhl | Sept. 2, 1941 |
| 2,265,143 | Butenandt | Dec. 9, 1941 |

FOREIGN PATENTS

| Number | Country | Date |
|---|---|---|
| 816,852 | France | May 10, 1937 |